United States Patent [19]

Björk et al.

[11] 3,852,341

[45] Dec. 3, 1974

[54] NOVEL IODINE CONTAINING POLYMERS USEFUL AS X-RAY CONTRAST AGENTS

[75] Inventors: Lars Björk; Uno Eugen Erikson; Kirsti Annikki Granath; Björn Gustav-Adolf Ingelman; Bernt Jabes Lindberg, all of Uppsala, Sweden

[73] Assignee: Pharmacia Aktiebolag, Uppsala, Sweden

[22] Filed: Apr. 26, 1971

[21] Appl. No.: 137,665

Related U.S. Application Data

[62] Division of Ser. No. 869,926, Oct. 27, 1969, Pat. No. 3,773,397, which is a division of Ser. No. 686,340, Nov. 28, 1967, abandoned and 775,920, Nov. 14, 1968, abandoned.

[52] U.S. Cl.................. 260/519, 260/501.11, 424/5
[51] Int. Cl................... C07c 101/54, C07c 103/30
[58] Field of Search..................... 260/519, 501.11

[56] References Cited
UNITED STATES PATENTS 3,574,718   4/1971   Bjork et al.......................... 260/519

Primary Examiner—Lorraine A. Weinberger
Assistant Examiner—L. A. Thaxton
Attorney, Agent, or Firm—Fred Philpitt

[57] ABSTRACT

Polymers consisting of alternating 2,4,6-triiodobenzoic acid derivative groups and intermediate aliphatic hydroxyl group containing bridges and physiological acceptable salts thereof. These polymers are particularly useful for X-ray visibilization of body cavities.

10 Claims, No Drawings

NOVEL IODINE CONTAINING POLYMERS USEFUL AS X-RAY CONTRAST AGENTS

REFERENCE TO RELATED APPLICATIONS

This application is a divisional application of our copending U.S. patent application Ser. No. 869,926 filed Oct. 27, 1969 and now U.S. Pat. No. 3,733,397, which in turn discloses and claims subject matter disclosed and claimed in our copending U.S. Pat. application Ser. No. 686,340 filed on Nov. 28, 1967, and now abandoned; and in our copending U.S. patent application Ser. No. 775,920 filed on Nov. 14, 1968 and now abandoned.

The present invention is concerned with novel iodine containing polymers useful as X-ray contrast agents.

More particularly, the present invention relates to a linear or branched polymer having an average molecular weight of at least 1900, said polymer being built up of alternating 2,4,6-triiodobenzoic acid derivative groups and intermediate straight or branched aliphatic, hydroxyl group-containing bridges, containing 3–30 carbon atoms, preferably 3–20 carbon atoms, said bridges being optionally broken by one or more oxygen bridges, and said polymer containing at least three 2,4,6-triiodobenzoic acid derivative groups, preferably at least four 2,4,6-triiodobenzoic acid derivative groups. The polymer is preferably used in the form of a non-toxic salt thereof, for example, the sodium salt and the methylglucamine salt, which are sufficiently water soluble.

The 2,4,6-triiodobenzoic acid derivative groups may, for instance, be groups of 3,5-diamino-2,4,6-triiodobenzoic acid derivatives or 3-amino-5-aminomethyl-2,4,6-triiodobenzoic acid derivatives or 5-amino-2,4,6-triiodoisophtalic monoamide derivatives such as 3,5-diacylamino-2,4,6-triiodobenzoic acid derivatives, where the acyl group is a lower acyl group having no more than 5 carbon atoms, preferably acetyl or propionyl, or 5-acylamino-2,4,6-triiodo-N-alkyl-isophtalic acid monoamide, where the acyl group is a lower acyl group having no more than 5 carbon atoms, e.g. acetyl or propionyl, and where the alkyl group is a lower alkyl group having no more than 5 carbon atoms, e.g. methyl or ethyl.

According to the invention the polymer may, for instance, be built up of alternating groups of the formula

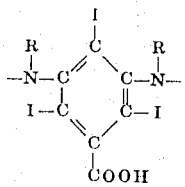

where R is lower acyl, lower alkyl having each no more than 5 carbon atoms or a hydrogen atom, R being preferably a lower acyl group, e.g. acetyl, or physiologically acceptable salts thereof, and bridges having the formula —A—, where A is an alkylene group substituted by one or more hydroxyl groups, said alkylene group containing 3–30 carbon atoms, preferably 3–20 carbon atoms, and being optionally broken by one or more oxygen bridges. The bridge forming group A can thus, for instance, have the formula —CH$_2$.CH(OH).CH$_2$.O.CH$_2$.CH(OH).CH$_2$— or

—CH$_2$.CH(OH).CH$_2$.O.CH$_2$.CH$_2$.O.CH$_2$.CH(OH).CH$_2$— or

—CH$_2$.CH(OH).CH$_2$.O.(CH$_2$)$_4$.O.CH$_2$.CH(OH).CH$_2$— or

—CH$_2$.CH(OH).CH$_2$.O.CH$_2$.CH(OH).CH$_2$.O.CH$_2$.CH(OH).CH$_2$— or

—CH$_2$.CH(OH).CH$_2$— or

—CH$_2$.CH(OH).CH$_2$.O.CH$_2$.CH(OH).CH$_2$.O.(CH$_2$)$_2$.O.CH$_2$.CH(OH).CH$_2$O.CH$_2$.CH(OH).CH$_2$— or

—CH$_2$.CH(OH).CH$_2$.O.CH$_2$.CH(OH).CH$_2$.O.(CH$_2$)$_4$.O.CH$_2$.CH(OH).CH$_2$.O.CH$_2$.CH(OH).CH$_2$— or

—CH$_2$.CH(OH).CH(OH).CH$_2$—.

Other examples of the 2,4,6-triiodobenzoic acid derivative group in the polymer are

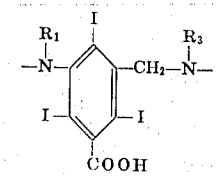

or

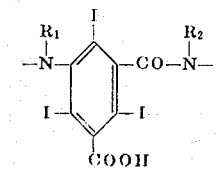

where $R_1$ is lower acyl, lower alkyl or hydrogen, said acyl and said alkyl containing each no more than 5 carbon atoms and $R_3$ is lower acyl, lower alkyl or hydrogen, said acyl and said alkyl containing each no more than 5 carbon atoms, and $R_2$ is a member selected from the group consisting of lower alkyl and hydrogen, said alkyl containing no more than 5 carbon atoms, or physiologically acceptable salts thereof. $R_1$ is preferably a lower acyl group, e.g. acetyl. $R_2$ is preferably a lower alkyl group, e.g. methyl.

The novel compounds are very useful as X-ray contrast agents. A preparation for carrying out X-ray investigations may suitably be in the form of a mixture, such as an aqueous solution or with a physiologically acceptable solid carrier; the preparation preferably being in the form of a tablet or some other suitable dosage unit and said mixture containing one or more of the aforementioned polymers (preferably in the form of non-toxic salts of the polymers) as the active contrast-producing substance. Such a mixture, preferably in the form of an aqueous solution, may contain 5–80 g, preferably 20–60 g, of the polymer per 100 ml of solution. The polymer used as a contrast-producing agent contains carboxylic acid groups and is usually used in the form of a physiologically acceptable salt, e.g. sodium or trishydroxymethylamino-methane or methylglucamine salt. These salts are water-soluble.

The upper limit for the average molecular weight is selected in accordance with the body cavity to be visibilized. For instance, in the case of investigating the gastro-intestinal tract very high values of up to several millions can be permitted; examples of such figures being 1,000,000 or 500,000. In case of blood vessels and urinary tracts, for instance, a value is suitably selected, which does not exceed about 200,000; products having an average molecular weight ($\overline{M}_{w}$) of about 100,000 and about 10,000 and about 4,000 being mentionable as examples. Concerning investigations in which it is desired that the contrastproducing agent is excreted through the kidneys a molecular weight lower than the kidney threshold, e.g. lower than 50,000, is chosen, products having an average molecular weight of respectively about 20,000, about 10,000 and about 3,000 being mentioned as examples.

By varying the molecular size of the polymers it is possible in turn to vary the properties of the polymers, especially regarding diffusion coefficient, osmotic pressure and viscosity of the solutions, resorption and excretion characteristics. In relation to existing X-ray contrast-producing agents, the present polymers offer valuable possibilities in varying the technique of diagnosing. Due to the excellent solubility properties conditioned by the hydroxyl group-content and the high degree of physiological acceptability in combination with the high molecular weight of the polymers, they can be used for many different types of X-ray investigations. Products having an average molecular weight of at least 1,900 but less than 5,000 are in the lower molecular weight range and products with an average molecular weight exceeding 5,000 are in the higher molecular weight range as contemplated by the present invention.

The hydroxyl group content in the polymers may be varied. A hydroxyl group content is chosen which on average is not lower than that which corresponds to one hydroxyl group per bridge. On average it is suitable to choose about two hydroxyl groups per bridge. In order to obtain an improved solubility in water, if desirable with respect to the manner in which the product is used, a bridge can be chosen which has an average of about four or more hydroxyl groups. If the number of hydroxyl groups in the bridge is insufficient, it is possible to introduce more such groups, for instance by introducing glycerol-ether groups.

The iodine content in the polymer can vary within wide limits depending on the purpose for which the agent is to be used. Generally an iodine content is chosen to exceed approximately 15%. However, usually values are chosen which considerably exceed 20%, e.g. which lie within the field of from 25 to 55%.

One example of the different body cavities which can be visibilized by the compounds of the invention is the gastro-intestinal tract. In this instance the high molecular weight contrastproducing agent is administered perorally in solid or solution form, whereupon it passes the gastro-intestinal duct without being appreciably resorbed, whereby the body of the test object is influenced upon only to a slight degree. According to the invention there may also be provided X-ray contrast-producing agents which can be used orally without being precipitated in the stomach by introducing a sufficiently high content of hydroxyl groups in the bridges A as defined above. This result represents an advantage in relation to what is attained by known X-ray contrast-producing agents as currently used. It is also possible to visibilize intestines by administering the high molecular weight contrast-producing agent through the rectum, in the form of an enema. Other examples are the visibilization of blood vessels and the heart. Because of the higher molecular weight of the contrast-producing agent the agent disappears from the blood subsequent to being injected in solution much slower than conventional contrast-producing agents. Thus, these contrast agents can be injected into veins and arteries. After injection into suitable arteries, not only these arteries but also the associated veins can be visibilized by X-ray photographs, which is not possible in the same advantageous way with ordinary contrast agents in current use. If the molecular size is selected below the kidney threshold, excretion of the substance with the urine can also be attained so that valuable information concerning the urine ducts can be obtained. Further examples are the use of the iodopolymers in hysterosalpingography, cholangiography, lymphography, urethrography, arthrography and sialography, the large molecular size of these new contrast agents being valuable.

When applying the method according to the invention the body of the test object to which the contrast-producing agent has been administered is exposed to X-rays whereupon photographs may be taken or the image observed direct on a fluorescent screen, or some other X-ray method may be used in a conventional manner. The dose of contrast-producing agent administered is selected according to the category of the investigation, so that a sufficient contrast effect is obtained. By way of example may be mentioned a dose within the range of from 1 g to 200 g of the polymer, usually within the range of 2 g to 100 g, especially within the range of 5 g to 50 g per person.

Carriers for the polymers may be conventional additive substances, such as water with regard to injection solutions and adjuvants when in tablet form.

Compared with X-ray photography using conventional contrast-producing agents of low molecular weight type (monomer type or in some instances dimer type) the present invention offers new possibilities within the diagnostic technique, owing to the fact that the substances used according to the invention present other resorption and excretion properties. Because said substances contain hydroxyl groups they possess good solubility properties and are well acceptable physiologically. The toxicity is thus low. The high molecular weight also affords a lower osmotic pressure and lower diffusion constants than conventional agents.

The polymer according to the invention may be produced by the copolymerization of substances which contain the 2,4,6-triiodobenzoic acid derivative groups and other functional groups, with a bifunctional substance which contains an aliphatic bridge having 3–30 carbon atoms and hydroxyl groups or groups, for instance, epoxide groups, which are capable of forming hydroxyl groups in the polymerization process.

An advantageous method of preparing suitable compounds is to react a bifunctional 2,4,6-triiodobenzoic acid derivative, such as 3,5-diacylamino-2,4,6-triiodobenzoic acid with a diepoxide such as bis-[2,3-epoxypropyl]-ether or 1,2-ethandioldiglycide ether or 1,4-butandioldiglycide ether or 1,3-glyceroldiglycide ether or 1,2-3,4-diepoxybutane or corresponding halogen hydrins, preferably chloro or bromo hydrins, or with epichlorohydrin or epibromohydrin, suitably in the presence of an alkaline reacting substance. Another example is to polymerize in a similar manner 3-amino-5-aminomethyl-2,4,6-triiodobenzoic acid or derivatives thereof such as acyl derivatives, e.g. acetyl derivatives.

Another example is to polymerize in a similar manner with the above mentioned diepoxides 5-amino-2,4,6-triiodoisophtalic acid monoamide derivatives, such as suitably 5-acylamino-2,4,6-triiodo-N-alkyl-isophtalic acid monoamide, e.g. 5-acetylamino-2,4,6-triiodo-N-methyl-isophtalic acid monoamide.

Thus, the bridges formed from the diepoxide will contain hydroxyl groups. If epichlorohydrin is used then one hydroxyl group is obtained in the bridge. If the diepoxides are used at least two hydroxyl groups are obtained in the bridge.

The desired average molecular weight of the polymer can be obtained either by causing the two starting materials to react to termination in proportions, which correspond to the desired product or by interrupting the reaction at the stage at which the desired degree of polymerization has been reached, if other proportions of the starting materials are chosen.

Similarly, as in the case of other polymers the products can be fractionated by fractional precipitation or by gel filtration. They may be dialyzed in order to get rid of dialyzable compounds of low molecular weight.

In the polymerization process, other polyfunctional substances can be added, such as NH$_3$ or amines such as diamines or polyhydroxy compounds such as pentaerythritol, to facilitate the polymerization.

If it is desired to further increase the content of hydroxyl groups and hence also the solubility, for instance, for oral preparations, the obtained hydroxyl group-containing polymers may be reacted with glycidol in the presence of an alkaline reacting substance to from glycerol ethers.

The synthesis of polymers according to the invention may be elucidated by the following schematic reaction formula, wherein a polymer is obtained by reacting 3,5-diacetylamino-2,4,6-triiodobenzoic acid with 1,4-butandioldiglycide ether in alkaline solution:

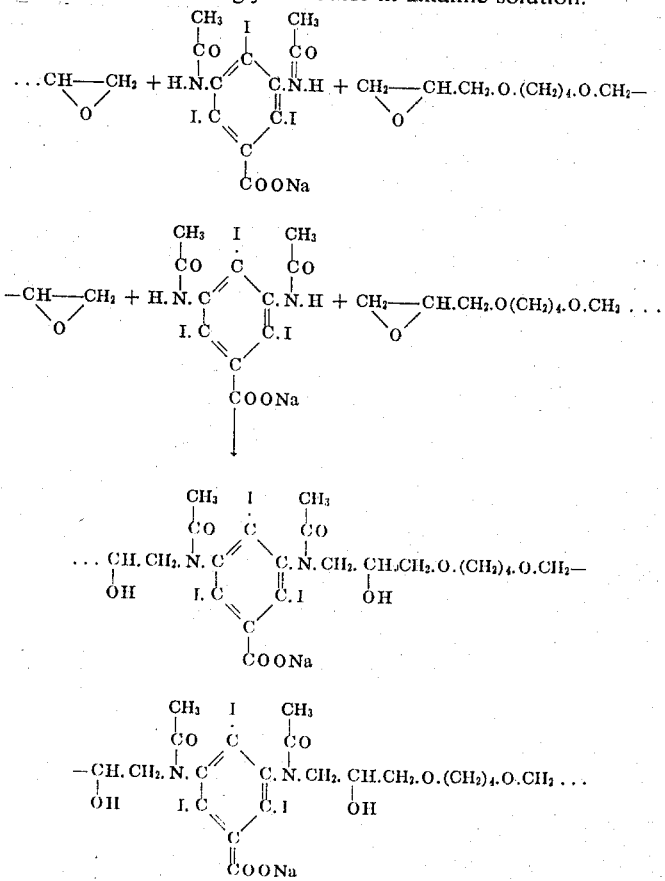

The diepoxide thus reacts with the reactive hydrogen atom at each nitrogen atom of the 3,5-diacetylamino-2,4,6-triiodobenzoic acid, forming hydroxyl group-containing bridges between the iodobenzoic acid derivative groups. Thus, a polymer is obtained which is built up of alternating 2,4,6-triiodobenzoic acid derivative groups and intermediate aliphatic, hydroxyl group-containing bridges. The reaction is preferably carried out in an alkaline aqueous solution, for example in a water solution of sodium hydroxide. The reaction is preferably carried out with a concentrated solution of 3,5-diacetylamino-2,4,6-triiodobenzoic acid, obtainable, for example, by dissolving the acid in 4 N sodium hydroxide solution. The diepoxide is slowly added to the solution of the acid in a molar ratio of, for example, 1 to about 1, while stirring the reaction mixture. The reaction temperature may, for example, be 20°C or 30°C. The reaction time can, for example, be one or two days. The product can be purified by precipitation with hydrochloric acid, dissolution of the precipitated acid as the sodium salt and renewed precipitation with hydrochloric acid. The precipitate can be washed with water for further purification. Solutions can be prepared from the obtained polyacid by neutralization, e.g. with NaOH or methylglucamine. If so desired, the neutral salt solution may, for instance, be fractionated by fractional precipitation, with acetone, for instance. The polymer may also be fractionated and purified by gel filtration, while recovering desired fractions.

The synthesis of polymers according to the invention may be further elucidated by the following schematic reaction formula wherein 5-acetylamino-2,4,6-triiodo-N-methyl-isophtalic acid monoamide is reacted in alkaline solution with 1,4-butandiol-diglycide ether:

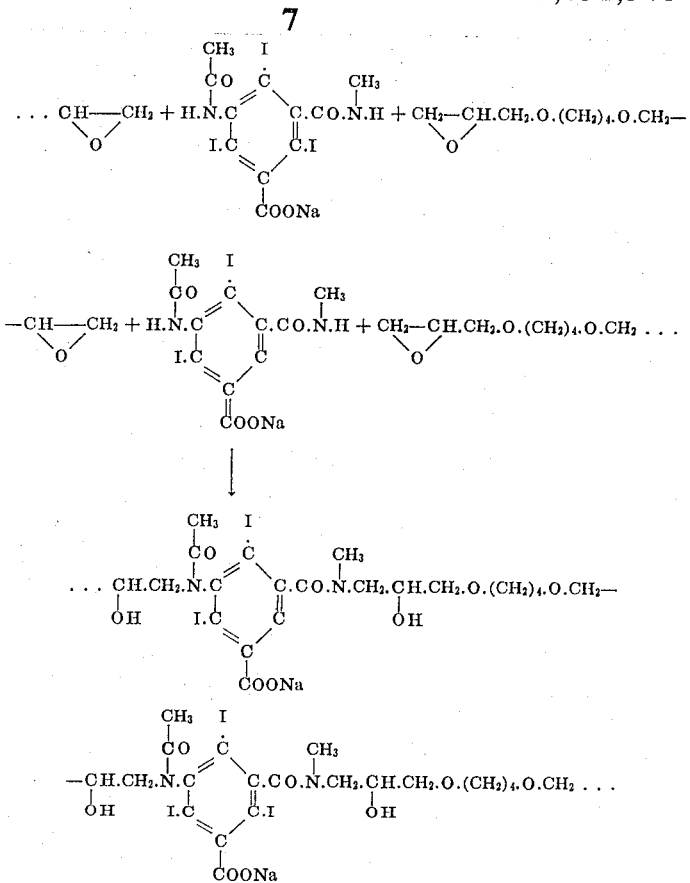

The diepoxide thus reacts with the reactive hydrogen atom at each nitrogen atom of the 5-acetylamino-2,4,6-triiodo-N-methyl-isophtalic acid monoamide, forming hydroxyl group-containing bridges between the iodobenzoic acid derivative groups. Thus, a polymer is obtained which is built up of alternating 2,4,6-triiodobenzoic acid derivative groups and intermediate aliphatic hydroxyl group-containing bridges. The reaction is preferably carried out with a concentrated solution of 5-acetylamino-2,4,6-triiodo-N-methyl-isophtalic acid monoamide obtainable, for example, by dissolving the acid in an aqueous solution of 4 N sodium hydroxide. The diepoxide is preferably slowly added to the solution of the acid, in a molar ratio of, for example, 1 to about 1, whilst stirring. The reaction temperature can, for example, be 20°C or 30°C. The reaction time may, for example, be 24 or 48 hours. The polymer may be precipitated with hydrochloric acid in its acid form. The polyacid may be dissolved in sodium hydroxide solution and reprecipitated with hydrochloric acid. The precipitate may be washed with water. Solutions of the polyacid are obtained by neutralization with sodium hydroxide or methylglucamine aqueous solutions. The polymer can be fractionated by gel filtration or by fractional precipitation of water solutions with, for example, acetone.

Polymers having a relatively high content of hydroxyl groups in their bridges can be prepared in the following way: In a first step, about 1 mole of the 2,4,6-triiodobenzoic acid derivative, for example 3,5-diacetylamino-2,4,6-triiodobenzoic acid or 5-acetylamino-2,4,6-triiodo-N-methyl-isophtalic acid monoamide, is reacted with about 2 moles of glycidol in alkaline aqueous solution whereby products of the following type are formed:

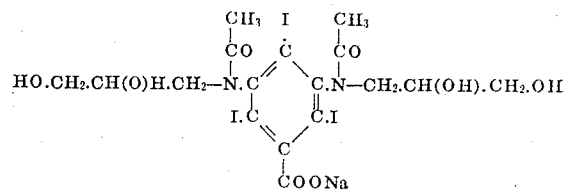

and

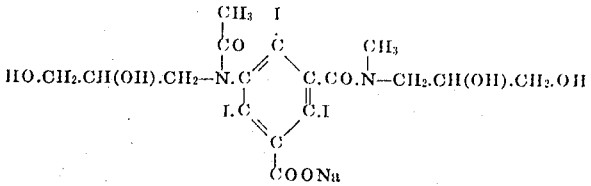

These products are then in a second step reacted with diepoxides, for example, 1,4-butandioldiglycide ether, 1,2-ethandioldiglycide ether and 1,3-glyceroldiglycide ether, in alkaline aqueous solution in a manner similar to what is described above, the diepoxide reacting with the hydroxyl groups of the derivatives obtained in the first step forming long bridges containing several hydroxyl groups, said bridges being, for example, of the type:

—CH$_2$.CH(OH).CH$_2$.O.CH$_2$.CH(OH).CH$_2$.O.(CH$_2$)$_4$.O.CH$_2$.CH(OH).CH$_2$.O—CH$_2$.CH(OH).CH$_2$—.

In order to introduce still more hydroxyl groups the polymers, in addition to what is obtained from the diepoxide, may be reacted with glycidol in alkaline aqueous solution, the reaction being illustrated by the schematic formula:

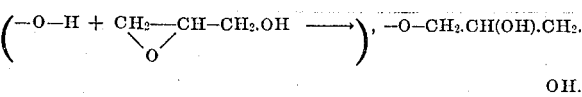

If, in the above copolymerization process, the diepoxide is added to the reaction mixture in an amount exceeding what is required to form the bridges between the 2,4,6-triiodobenzoic acid derivative groups, the diepoxide can also react with hydroxyl groups in the bridges of polymers already formed to form branches whereby the content of hydroxyl groups will be further increased. In this connection, a cross-linking between different hydroxyl group-containing polymer molecules can take place, whereby the molecular size of the polymers are further increased.

If the preparation containing polymers according to the invention is in the form of an aqueous solution it may be suitable to include the polymers in a content of from 5 g to 80 g per 100 ml solution, depending upon the field of application. In this connection values of 20 g or 30 g or 40 g and even 50 g or 60 g per 100 ml solution may come in question.

The invention will now be described with reference to the following examples.

EXAMPLE 1

61.4 grams of 3-acetylamino-5-acetylamino-2,4,6-triiodobenzoic acid were dissolved in 60 ml of 4 N NaOH solution (in water). 17 ml of 1,4-butandioldiglycide ether were added dropwise very slowly (6 hours) at 20°C whilst stirring. The reaction mixture was allowed to stand at 20°C for one day. The formed polyacid was precipitated with 3 N hydrochloric acid. The product was dissolved again by adding 4 N NaOH solution until the polyacid dissolved as sodium salt. The polyacid was then precipitated again by adding 3 N hydrochloric acid. The product was washed with water and vacuum dried at 50°C. The product is soluble as its sodium salt. The average molecular weight was about 3800.

The polymer (in acid form) is built up of alternating groups of the formula

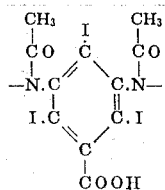

and intermediate bridges of the type
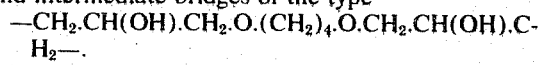

Corresponding salts are obtained by neutralization of the carboxylic groups with, for example, sodium hydroxide or methylglucamine.

25 grams of the polymer in acid form were dissolved by adding water and methylglucamine to a pH of 7.3, the amount of water being selected so that the solution volume was 50 ml. The solution was filtered and poured into bottles, which were closed and sterilized in an autoclave.

The solution was injected into the veins of rabbits, whereupon the veins could be visibilized by X-ray photographs. The solution was also injected into arteries of rabbits, whereupon not only the arteries but also associated veins could be visibilized by X-ray photographs. When injecting a corresponding dosage of conventional monomer contrast-producing agents into the same arteries the associated veins could not be visibilized in the same advantageous manner. The contrast-producing agent of the invention thus affords new diagnostic possibilities.

EXAMPLE 2

61.4 grams of 5-acetylamino-2,4,6-triiodo-N-methyl-isophtalic acid monoamide were dissolved in 60 ml of 4 N NaOH solution (in water). 18 ml of 1,4-butandiol-diglycide ether were added very slowly (6 hours) dropwise at 20°C whilst stirring. The reaction mixture was allowed to stand at 20°C for 24 hours. The formed product was precipitated with 3 N hydrochloric acid. The polyacid was re-dissolved by adding 4 N aqueous solution of NaOH until the acid was dissolved. The product was then reprecipitated in acid form by adding 3 N hydrochloric acid until no more precipitate was formed. The product was was washed with water and dried in vacuum at 50°C. The product is soluble as its sodium salt. The average molecular weight was about 4200.

The polymer (in acid form) is built up of alternating groups of the formula

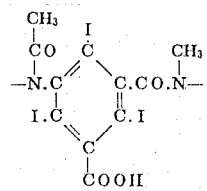

and intermediate bridges of the type
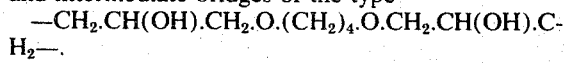

Corresponding salts are obtained by neutralization of the carboxylic groups with, for example, sodium hydroxide or methylglucamine.

25 grams of the polymer in acid form was dissolved in water by adding methylglucamine to pH 7.3, the quantity of water being selected so that the solution volume was 50 ml. The solution was filtered and poured into bottles, which were closed and sterilized in an autoclave.

The solution was injected into the veins of rabbits, whereupon the vessels could be visibilized in an advantageous manner. The solution was also injected into the arteries of rabbits, whereupon it was not only possible to visibilize said arteries but associated veins could also be seen in the resulting X-ray photographs. When injecting a corresponding dose of conventional low molecular weight monomer contrast-producing agent in the same arteries the associated veins could not be visibilized in the same advantageous manner. The polymer in question thus affords new diagnostic possibilities.

EXAMPLE 3

61.4 grams of 3-acetylamino-5-acetylamino-2,4,6-triiodo-benzoic acid were dissolved in 70 ml of 4 N aqueous solution of NaOH. 12.8 ml of glycidol were added very slowly (6 hours) dropwise at 20°C whilst stirring. The reaction mixture was allowed to stand for two days. (During the reaction the hydrogen atoms on the nitrogen atoms are exchanged with the substituent

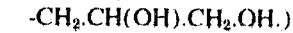

18 ml of 1,4-butandioldiglycide ether were then added slowly (6 hours) dropwise at 20°C while stirring. The reaction mixture was allowed to stand at 20°C for 24 hours. (The diepoxide polymerises the iodomonomer units by reacting with the hydroxyl groups in the aforementioned glycerol residues.) The reaction mixture was neutralized with 6 N HCl to pH 7, whereafter the sodium salt of the polymer was precipitated with acetone. The product was dissolved in some water, whereafter it was re-precipitated with acetone and vacuum dried at 50°C. By slightly varying the quantity of 1,4-butandioldiglycide ether products were obtained having a varying average molecular weight within the limits as set forth in the claims.

The polymer (in acid form) is built up of alternating groups of the formula

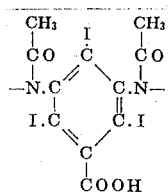

and intermediate bridges of the type
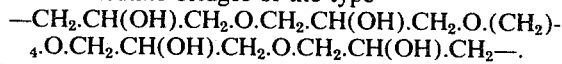
—$CH_2.CH(OH).CH_2.O.CH_2.CH(OH).CH_2.O.(CH_2)_4.O.CH_2.CH(OH).CH_2.O.CH_2.CH(OH).CH_2$—.

Corresponding salts are obtained by neutralization of the carboxylic groups with, for example, sodium hydroxide or methylglucamine.

The products are distinguished by their very excellent solubility in water as a result of the chosen polyhydroxy bridge between the iodomonomer units. The products are also readily soluble in acid stomach juices and are thereby particularly suitable for oral use when it is desired to visibilize the gastro-intestinal tract. This was proved by administering neutral solutions of said product having an average molecular weight of about 4,000 (e.g. containing 50 grams of substance per 100 ml solution) orally to rats, whereupon the gastro-intestinal duct could be visibilized in an advantageous manner.

EXAMPLE 4

A series of experiments were made completely in analogy with those described in Example 3 with the exception that the same amounts of 5-acetyl-amino-2,4,6-triiodo-N-methyl-isophtalic acid monoamide and glycidol and 1,4-butandioldiglycide ether were used. Even in this instance it was possible to obtain products presenting average molecular weights within the appropriate field subsequent to the reaction with glycidol, by variation of the quantities of bridge forming diepoxide.

The polymer (in acid form) is built up of alternating groups of the formula

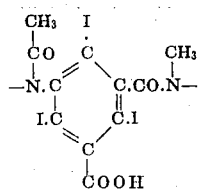

and intermediate bridges of the type
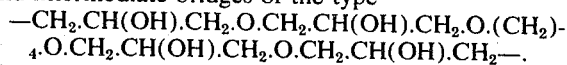
—$CH_2.CH(OH).CH_2.O.CH_2.CH(OH).CH_2.O.(CH_2)_4.O.CH_2.CH(OH).CH_2.O.CH_2.CH(OH).CH_2$—.

Corresponding salts are obtained by neutralization of the carboxylic groups with, for example, sodium hydroxide or methylglucamine.

The sodium salt of these products was readily soluble in water and also in acid stomach juices, and was found particularly suitable for visibilizing the gastro-intestinal duct, as could be shown, for instance, on rats and rabbits by administering solutions of a product having an average molecular weight of about 4,000 orally, there being, for instance, used 40 or 50 grams of the substance per 100 ml of solution.

EXAMPLE 5

In the following examples 5a–5e there was used a polymer built up of alternating groups of the formula

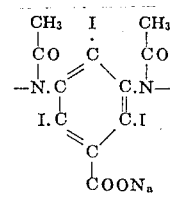

and intermediate bridges of the type
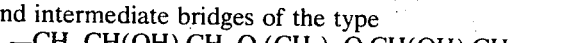
—$CH_2.CH(OH).CH_2.O.(CH_2)_4.O.CH_2.CH(OH).CH_2$—,
different average molecular weights being used for the polymer. The polymer can be obtained by reacting 3,5-diacetylamino-2,4,6-triiodobenzoic acid with 1,4-butandioldiglycide ether in alkaline aqueous solution, for example, in the following manner:

614 g of 3,5-diacetylamino-2,4,6-triiodobenzoic acid are dissolved in 600 ml of 4 N aqueous solution of sodium hydroxide. About 170 ml of 1,4-butandioldiglycide ether or varying amounts of diepoxide are added slowly in a dropwise manner at 20°C with sufficient stirring. After 24 hours, for example, the polymer product as formed is precipitated with a 3 N aqueous solution of hydrochloric acid and washed with water. (The polyacid formed represents a polymer product containing molecules of varying size. By varying the reaction conditions slightly, for example, regarding amounts of starting materials, solution volume and temperature, polymer products of different average molecular weights can be obtained.) The polyacid can be dissolved in its sodium salt by adding water and neutralization with sodium hydroxide. It can be purified by another precipitation as the polyacid by adding hydrochloric acid after which the precipitate is washed with water. Such precipitation operations can be repeated several times. In order to obtain fractions of narrower molecular weight distribution aqueous solutions of the sodium salt of the polymers can be fractionated by successively adding increasing amounts of acetone with sufficient stirring, that is, a precipitation fractionation of the type as commonly used within polymer chemistry. The fraction precipitating at the lowest acetone concentration is the most high molecular weight part of the polymer. Increasing the concentration of acetone then results in products having successively lower average molecular weights. The fraction of the lowest molecular weight is isolated in a suitable manner in that, after recovering the insoluble fraction after the last addition of acetone, the remaining solution is evaporated to dryness after which the remaining substance in this solution is recovered. By this manner of operation fractions of different average molecular weights are obtained. It is also possible to effect a fractionation by gel filtration, for example, by means of gels obtained by cross-linking dextran with epichlorohydrin (such gels of different swellability are available under the trade mark name Sephadex). The polymer products can also be freed of dialysable substances in a similar manner. If the polymer was isolated in the form of its polyacid aqueous solutions thereof are prepared by the addition of water and neutralization with a suitable salt former, for example, by neutralization with sodium hydroxide or methylglucamine.

EXAMPLE 5a

A solution was prepared by dissolving 50 grams of polymer in the form of methyl glucamine salt according to the aforegoing, said polymer having an average molecular weight of approximately 4000, and 0.8 gram of NaCl in water to a solution volume of 100 ml. pH was adjusted to 7.3–7.4 with HCl and NaOH. The solution was filtered and poured into bottles, which were closed and sterilized in an autoclave.

The solution was injected into the blood vessels of rabbits, whereafter said blood vessels and the cavities of the heart could be visibilized by X-rays and photographs. X-ray exposure of the kidney area and subsequent photographs show filling of the contrast-producing agent in the renal pelvis, ureter and bladders.

EXAMPLE 5b

A solution was prepared by dissolving 30 grams of polymer in the form of methylglucamine salt according to the aforegoing, said polymer having an average molecular weight of approximately 3,400, and 0.8 gram of NaCl in water to a solution volume of 100 ml. pH was adjusted to 7.3–7.4 with HCl and NaOH. The solution was filtered and poured into bottles, which were sealed and sterilized in an autoclave.

The solution was injected intraveneously into rabbits. X-ray exposure of the kidney region and photographs showed filling of contrast-producing agent in the renal pelvis, ureters and bladders.

EXAMPLE 5c

A solution was prepared by dissolving 40 grams of polymer in the form of methylglucamine salt according to the aforegoing, said polymer having an average molecular weight of approximately 3,000, in water to a solution volume of 100 ml. pH was adjusted to 7.3–7.4 with HCl and NaOH. The solution was filtered and poured into bottles, which were sealed and sterilized in an autoclave.

The solution was injected intraveneously into animals, e.g. rabbits. X-ray exposure of the kidney region and photographs showed filling of contrast-producing agent of the renal pelvis, ureters and bladders.

EXAMPLE 5d

An enema was prepared by dissolving 40 grams of polymer in the form of sodium salt according to the aforegoing, said polymer having an average molecular weight of approximately 4,000, and 0.5 gram of NaCl in water to a solution volume of 100 ml (pH = 7).

The enema was administered through the rectum to rabbits, whereafter the intestines could be visibilized by X-rays and photographs.

EXAMPLE 5e

A solution was prepared by dissolving 40 grams of polymer in the form of sodium salt according to the aforegoing, said polymer having an average molecular weight of approximately 4,000, and 0.2 gram of NaCl in water to a solution volume of 100 ml. pH was adjusted to 7.

The solution was administered orally to rabbits, whereafter the gastro-intestine duct could be visibilized by X-rays and photographs.

EXAMPLE 6

61.4 grams of 3-acetylamino-5-acetylamino-2,4,6-triiodobenzoic acid were dissolved in 60 ml of 4N aqueous solution of sodium hydroxide. 24 ml of 1,4-butandioldiglycide ether were added very slowly dropwise for 6 hours at 20°C whilst stirring. The reaction mixture was allowed to stand at 20°C for 24 hours and was then neutralized to pH 7 with acetic acid. The solution was then dialysed for several days against water, whereafter the solution was concentrated under vacuum at 50°C. The average molecular weight of the resulting substance was approximately 33,000.

The polymer (in acid form) is built up of alternating groups of the formula

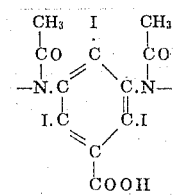

and intermediate bridges of the type
—CH$_2$.CH(OH).CH$_2$.O.(CH$_2$)$_4$.O.CH$_2$.CH(OH).CH$_2$—.

Corresponding salts are obtained by neutralization of the carboxylic groups with, for example, sodium hydroxide or methylglucamine.

25 grams of the polymer (in the form of its Na-salt) were dissolved in water to a solution volume of 50 ml. The pH of the solution was adjusted to 7.3 (using NaOH and HCl). The solution was filtered and poured into bottles which were sealed and sterilized in an autoclave at 110°C.

The solution was injected into the veins of rabbits, whereupon it was possible to visibilize the veins by X-ray photography.

The solution was also injected into the arteries of rabbits, whereupon it was not only possible to visibilize said arteries but also the associated veins by X-ray photographs. When injecting a corresponding dose of conventional monomer contrast-producing agents into the same arteries, the associated veins could not be visibilized in the same advantageous manner. The contrast-producing agent according to the invention thus affords new diagnostic possibilities.

EXAMPLE 7

61.4 grams of 5-acetylamino-2,4,6-triiodo-N-methyl-isophtalic acid monoamide were dissolved in 60 ml 4 N aqueous solution of sodium hydroxide. 20 ml of 1,4-butandioldiglycide ether were slowly added whilst stirring at 20°C. The reaction mixture was allowed to stand at 20°C for two days. The resulting product was precipitated with 3 N hydrochloric acid. The polyacid was redissolved by adding water and a 4 N aqueous solution of sodium hydroxide until the polyacid dissolved as a sodium salt. The product was then re-precipitated in acid form by adding 3 N hydrochloric acid. The product was washed with water and dried under vacuum at 50°C. The product is soluble as a sodium salt. Aqueous solutions of the sodium salt can be fractionated with acetone. The average molecular weight was approximately 7,000.

The polymer (in acid form) is built up of alternating groups of the formula

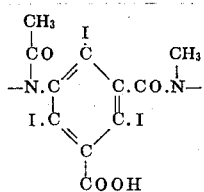

and intermediate bridges of the type

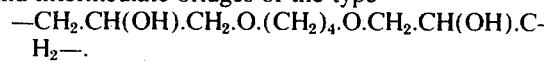

Corresponding salts are obtained by neutralization of the carboxylic groups with, for example, sodium hydroxide or methylglucamine.

25 grams of the polymer in acid form were dissolved in water by adding methylglucamine to pH 7.3, the quantity of water being selected so that the volume was 50 ml. The solution was filtered and poured into bottles, which were sealed and sterilized in an autoclave at 110°C.

The solution was injected into the veins of rabbits, whereupon the veins could be visibilized by X-ray photographs. X-ray exposure of the kidney region and photographs showed filling of contrast-producing agent of the renal pelvis, ureters and bladders.

The solution was also injected into the arteries of rabbits, whereupon not only said arteries but also the associated veins could be visibilized by X-ray photographs. When injecting a corresponding dosage of current monomer of contrast producing agents into the same arteries, the associated veins could not be visibilized to the same advantageous manner. The contrast producing agent according to the invention thus affords new diagnostic possibilities.

EXAMPLE 8

61.4 grams of 3-acetylamino-5-acetylamino-2,4,6-triiodobenzoic acid were dissolved in 60 ml of 4 N aqueous solution of sodium hydroxide. 20 ml of 1,4-butandioldiglycide ether were dropwise added slowly whilst stirring, for 5 hours at 20°C. The reaction mixture was left to stand at 20°C for two days, whereafter it was neutralized with hydrochloric acid to pH 7. The resulting polymeric product was precipitated with acetone. It was re-dissolved in water and precipitated by adding 3 N hydrochloric acid. The polyacid was dissolved again by adding water and 4 N aqueous solution of sodium hydroxide, until the polyacid had dissolved as sodium salt. The product was then re-precipitated in acid form by adding 3 N hydrochloric acid. The product was washed with water and dried under vacuum at 50°C. The product is soluble as its sodium salt. Aqueous solutions of the sodium salt can be fractionated with acetone. The average molecular weight was about 10,000.

The polymer (in acid form) is built up of alternating groups of the formula

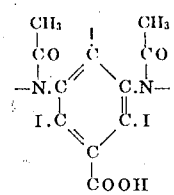

and intermediate bridges of the type

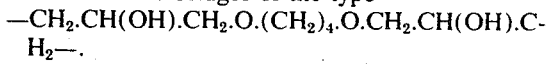

Corresponding salts are obtained by neutralization of the carboxylic groups with, for example, sodium hydroxide or methylglucamine.

25 grams of the polymer in acid form were dissolved in water by adding methylglucamine to pH 7.3, the quantity of water being selected so that the volume of the solution was 50 ml. The solution was filtered and poured into bottles, which were sealed and sterilized in an autoclave at 110°C.

The solution was injected into the veins of rabbits, whereupon the veins could be visibilized by X-ray photographs. X-ray exposure of the kidney region and photographs showed filling of contrast producing agent of the renal pelvis, ureters and bladders.

The solution was also injected into the arteries of rabbits, whereupon not only these arteries but also the associated veins could be visibilized by X-ray photographs. When injecting a corresponding dosage of conventional monomer contrast producing agents into the same arteries, the associated veins could not be visibilized to the same advantage. The contrast producing agent according to the invention thus affords new diagnostic possibilities.

EXAMPLE 9

61.4 grams of 3-acetylamino-5-acetylamino-2,4,6-triiodobenzoic acid were dissolved in 70 ml of 4 N aqueous solution of sodium hydroxide. 12.8 ml of glycidol were added slowly dropwise at 20°C whilst stirring. The reaction mixture was left to stand at 20°C for two days. (In the reaction the hydrogen atoms on the nitrogen atoms were replaced by the substituent

—CH$_2$.CH(OH).CH$_2$.OH.)

24 ml of 1,4-butandioldiglycide ether were then slowly added dropwise whilst stirring at 20°C. The reaction mixture was then left to stand for one day at 20°C. (The diepoxide polymerises the iodomonomer units by reacting with the hydroxyl groups in the afore-mentioned glycerol residues.) The reaction mixture was neutralized with 6 N hydrochloric acid to pH 7, whereafter the sodium salt of the polymer was precipitated with acetone. The product was dissolved in a small quantity of water, whereafter it was re-precipitated with acetone and dried under vacuum at 50°C. The average molecular weight was about 15,000.

The polymer (in acid form) is built up of alternating groups of the formula

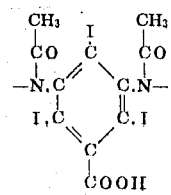

and the intermediate bridges of the type
—CH$_2$.CH(OH).CH$_2$.O.CH$_2$.CH(OH).CH$_2$.O.(CH$_2$)$_4$.O.CH$_2$.CH(OH).CH$_2$.O.CH$_2$.CH(OH).CH$_2$—.

Corresponding salts are obtained by neutralization of the carboxylic groups with, for example, sodium hydroxide or methylglucamine.

The polymer product is characterized by its excellent solubility properties in water, as a result of the selected bridge, provided with a plurality of hydroxyl groups, between the iodocontaining units. The product is also soluble in acid stomach juices and is therefore particularly suitable for oral use when visibilizing the intestinal tract. This was proved by orally administering to rats and rabbits a neutral solution of this product, for instance 40 or 50 grams of substance per 100 ml solution being used. In this way, the gastro-intestinal tract could be visibilized in an advantageous manner without any toxic effects on animals.

EXAMPLE 10

61.4 grams of 5-acetylamino-2,4,6-triiodo-N-methyl-isophtalic acid amonoamide were polymerised in a matter completely analogous with Example 9, and an analogous polymeric product was obtained having an average molecular weight of about 10,000. This polymeric product was also distinguished by its good solubility in water and also excellent solubility in acid stomach juices, and is therefore particularly suitable for oral use when visibilizing the gastro-intestinal tract. Neutral solutions were prepared containing 40 and 50 grams of substance per 100 ml solution. These solutions were administered orally to rats and rabbits, whereafter the gastro-intestinal tract could be visibilized in an advantageous manner.

The polymer (in acid form) is built up of alternating groups of the formula

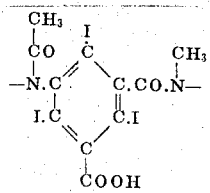

and the intermediate bridges of the type
—CH$_2$.CH(OH).CH$_2$.O.CH$_2$.CH(OH).CH$_2$.O.(CH$_2$)$_4$.O.CH$_2$.CH(OH).CH$_2$.O.CH$_2$.CH(OH).CH$_2$—.

Corresponding salts are obtained by neutralization of the carboxylic groups with, for example, sodium hydroxide or methylglucamine.

EXAMPLE 11

In the following examples 11a–11d there was used a polymer built up of alternating groups of the formula

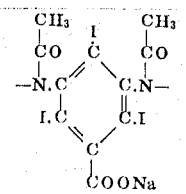

and intermediate bridges of the type
—CH$_2$.CH(OH).CH$_2$.O.CH$_2$.CH$_2$.O.CH$_2$.CH(OH).CH$_2$, different average molecular weight being used for the polymer. The polymer can be obtained by reacting 3,5-diacetylamino-2,4,6-triiodobenzoic acid with 1,2-ethandioldiglycide ether in alkaline aqueous solution, for example, in the following manner:

614 g of 3,5-diacetylamino-2,4,6-triiodobenzoic acid are dissolved in 600 ml of 4 N aqueous solution of sodium hydroxide. About 180 ml of 1,2-ethandioldiglycide ether or varying amounts of diepoxide are added slowly in a dropwise manner at 20°C with sufficient stirring. After 24 hours, for example, the polymer product as formed is precipitated with a 3 N aqueous solution of hydrochloric acid and washed with water. (The polyacid formed represents a polymer product containing molecules of varying size. By varying the reaction conditions, for example, regarding amounts of starting materials, solution volume and temperature, polymer products of different average molecular weights can be obtained.) The polyacid can be dissolved as in its sodium salt by adding water and neutralization with sodium hydroxide. It can be purified by another precipitation as the polyacid by adding hydrochloric acid after which the precipitate is washed with water. Such precipitation operations can be repeated several times. In order to obtain fractions of narrower molecular weight distribution aqueous solutions of the sodium salt of the polymers can be fractionated by successively adding increasing amounts of acetone with sufficient stirring, that is, a precipitation fractionation of the type as commonly used within polymer chemistry. The fraction precipitating at the lowest acetone concentration is the most high molecular weight part of the polymer. Increasing the concentration of acetone then results in products having successively lower average molecular weights. The fraction of the lowest molecular weight is isolated in a suitable manner in that, after recovering the insoluble fraction after the last addition of acetone, the remaining solution is evaporated to dryness after which the remaining substance in this solution is recovered. By this manner of operation fractions of different average molecular weights are obtained. It is also possible to effect a fractionation by gel filtration, for example, by means of gels obtained by cross-linking dextran with epichlorohydrin (such gels of different swellability are available under the trade mark name Sephadex). The polymer products can also be freed of dialysable substances in a similar manner. If the polymer was isolated in the form of its polyacid aqueous solutions thereof are prepared by the addition of water and neutralization with a suitable salt former, for example, by neutralization with sodium hydroxide or methylglucamine.

EXAMPLE 11a

An enema composition was prepared by dissolving 40 grams of polymer according to the foregoing; having an average molecular weight ($\overline{M}_w$) of 120,000, and 0.5 gram of NaCl in water to a solution volume of 100 ml (pH = 7).

The enema was administered to rabbits, whereupon the intestines could be visibilized by X-rays and photographs.

EXAMPLE 11b

A solution was prepared by dissolving 40 grams of the above polymer having an average molecular weight of 170,000, and 0.2 gram of NaCl, in water to a solution volume of 100 ml. pH was adjusted to 7.

The solution was administered perorally to rabbits, whereupon the gastro-intestinal tract could be visibilized by X-rays and photographs.

EXAMPLE 11c

A solution was prepared by dissolving 40 grams of the above polymer having an average molecular weight of 80,000, and 0.8 gram of NaCl, in water to a solution volume of 100 ml. pH was adjusted to 7.3 – 7.4 with HCl and NaOH. The solution was filtered and poured into bottles, which were sealed and sterilized in an autoclave.

The solution was injected into the blood vessels of rabbits, whereupon the blood vessels and the cavities of the heart could be made visible by X-rays and photographs.

EXAMPLE 11d

A solution was prepared by dissolving 30 grams of the above polymer having an average molecular weight of 20,000, and 0.8 gram of NaCl, in water to a solution volume of 100 ml. pH was adjusted to 7.3 – 7.4 with HCl and NaOH. The solution was filtered and poured into bottles, which were sealed and sterilized in an autoclave.

The solution was injected intraveneously into rabbits, X-ray exposure of the kidney region and photographing showed filling of contrast-producing agent in the renal pelvis, ureters and bladders.

EXAMPLE 12

184.2 grams of 5-acetylamino-2,4,6-triiodo-N-methyl-isophtalic acid monoamide was suspended in 90 ml 4.6 N aqueous solution of sodium hydroxide whilst stirring. 58.5 ml of 1,4-butandioldiglycide ether were added slowly dropwise during 6 hours at 30°C whilst stirring. The reaction mixture was stirred at 30°C for further 1 hour and was then left at 20°C for about 16 hours. The polymer in acid form was precipitated by addition of 6 N HCl. The polyacid was washed with water and then dissolved in water by neutralization with NaOH. The precipitation procedure was repeated twice. After the last precipitation the polymer in its acid form was washed with water and then dried in vacuum at 50°C. The average molecular weight ($M_w$) of the polymer was 7,100.

The polymer (in acid form) is built up of alternating groups of the formula

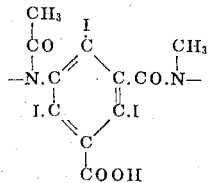

and intermediate bridges of the type
—$CH_2.CH(OH).CH_2.O.(CH_2)_4.O.CH_2.CH(OH).CH_2$—.

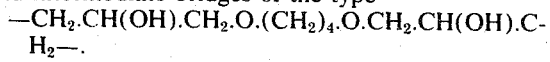

An aqueous solution was prepared by neutralization of the polymer (in acid form) with methylglucamine to pH 7.3, using 45 g of the polyacid per 100 ml solution. The solution was filtered and filled on bottles which were closed and sterilized at 110°C during 30 minutes. The solution was used for X-ray investigations in animals, for example, for visualization of the blood vessels. When injected into arteries, not only the arteries could be visibilized, but also associated veins in a more advantageous manner than after injection of conventional contrast agents as the polymeric contrast agent disappeared more slowly from the vessels.

EXAMPLE 13

122.8 grams of 5-acetylamino-2,4,6-triiodo-N-methyl-isophtalic acid monoamide was suspended in 50 ml 5.6 N aqueous solution of sodium hydroxide whilst stirring at 30°C. 25.6 ml of glycidol were added slowly dropwise during 4 hours stirring at 30°C. The reaction mixture was stirred at 30°C for further 1 hour and was then left at 20°C for about 16 hours. 10 ml of 10 N aqueous solution of sodium hydroxide were then added to the reaction mixture. 40 ml of 1,4-butandioldiglycide ether were then added slowly dropwise during 5 hours whilst stirring at 30°C. The reaction mixture was then left at 20°C for about 16 hours. 250 ml of water was added and the pH was adjusted to about 1.5 with 6 N HCl. Some precipitate was formed which was removed by centrifugation and discarded. The solution was neutralized to pH 7 with 4 N sodium hydroxide solution. The solution was concentrated by evaporation in vacuum at 50°C. The sodium salt of the polyacid was precipitated by addition of acetone. The substance was dissolved in 120 ml of water and was precipitated again with 500 ml acetone. The substance was dried in vacuum at 50°C. It was dissolved in water and dialyzed for about 16 hours against water. The dialyzed solution was concentrated by evaporation in vacuum at 50°C. The sodium salt of the polymer was precipitated by addition of acetone and was then dried in vacuum at 50°C. The average molecular weight ($M_w$) of the polymer was 8,000.

The polymer is built up of alternating groups of the formula

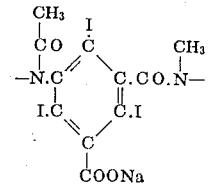

and intermediate bridges of the type
—$CH_2.CH(OH).CH_2.O.CH_2.CH(OH).CH_2.O.(CH_2)_4.O.CH_2.CH(OH).CH_2.O.CH_2-CH(OH).CH_2$—.

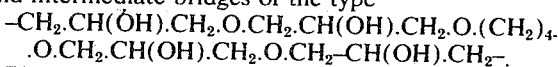

The product is very well soluble in water. An aqueous solution of the polymer was prepared containing 50 g substance per 100 ml solution. The pH was adjusted with NaOH and HCl to 7.3. The solution was filtered and filled on bottles which were closed and sterilized at 110°C during 30 minutes. Experiments were made on dogs with this solution and solutions prepared from substances produced in a similar way. Oral administration showed that the gastro-intestinal tract could be visibilized in an advantageous manner without any toxic effects on the animals.

No precipitation of this polymeric contrast agent in the stomach could be observed. Comparing experiments with a preparation consisting of a solution of salts (sodium and methylglucamine salts) of 3-acetylamino-5-acetylamino-2,4,6-triiodobenzoic acid (which now is the preparation used for the same purpose in the clinics) showed that this contrast agent in current use was precipitated in the stomachs of the dogs to a considerable extent.

Experiments, e.g., in mice showed that solutions of these polymeric contrast agents were harmless for oral administration, for instance.

EXAMPLE 14

The active substances prepared according to example 3, 4, 9 and 10 in the form of their respective sodium salt in solid form were mixed with milk sugar, corn starch, talcum, magnesium stearate and gelatin after which tablets were pressed from the mixture obtained, each of which had a total weight of 400 mg. The proportions of the substances contained in the mixture were selected in the following manner:

200 mg of sodium salt of the active substance,
130 mg of milk sugar,
50 mg of corn starch
12 mg of talcum,
4 mg of magnesium stearate and
4 mg of gelatin.

The tablets were usable for oral administration.

In a manner similar to that described in the aforegoing examples X-ray pictures can be obtained, for instance, with polymers of different average molecular weight obtained by polymerizing 3,5-diacetyl-amino-2,4,6-triiodobenzoic acid with 1,2-ethandioldiglycide ether or 3-amino-5-aminomethyl-2,4,6-triiodobenzoic acid or derivatives thereof with diepoxides such as 1,4-butandioldiglycide ether or 1,2-ethandioldiglycide ether or 1,2-3,4-diepoxibutane or bis[2,3-epoxypropyl]-ether. Other valuable examples are polymers obtained by polymerizing bifunctional 5-amino-2,4,6-triiodoisophtalic acid monoamide derivatives, e.g. 5-acylamino-2,4,6-triiodo-N-alkyl-isophtalic acid monoamide, where acyl and alkyl are lower acyl and lower alkyl groups, with bridge formers of the aforementioned type. Examples of such polymerization products are those obtained by polymerization in an alkaline aqueous solution of 5-acetylamino-2,4,6-triiodo-N-methyl-isophtalic monoamide with 1,4-butandioldiglycide ether or 1,2-ethandioldiglycide ether or epichlorohydrin or 1,2-3,4-diepoxibutane or bis[2,3-epoxypropyl]-ether or 1,3-glyceroldiglycide ether.

What we claim is:

1. A polymer consisting of repeating units of the formula

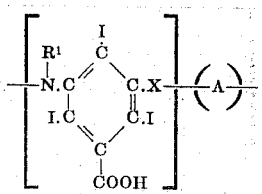

wherein X is a member selected from radicals having the formulas

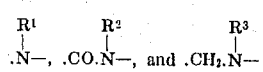

wherein $R^1$ and $R^3$ each are a member selected from the group consisting of hydrogen, alkanoyl and alkyl having each no more than 5 carbon atoms and $R^2$ is a member selected from the group consisting of hydrogen and alkyl having no more than 5 carbon atoms, and wherein A is an alkylene group substituted by at least one hydroxyl group, said alkylene containing 3–30 carbon atoms, and being broken by at least one oxygen bridge and said polymer being built up of alternating 2,4,6-triiodobenzoic acid derivative groups of the formula indicated above and the groups A and said polymer containing at least three such 2,4,6-triiodobenzoic acid derivative groups and having an average molecular weight of at least 1900 and physiologically acceptable salts thereof.

2. A polymer consisting of repeating units of the formula

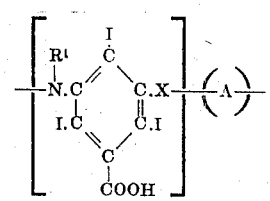

wherein X is a member selected from radicals having the formulas

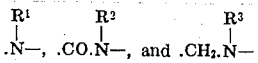

wherein $R^1$ and $R^3$ each are a member selected from the group consisting of hydrogen, alkanoyl and alkyl having each no more than 5 carbon atoms and $R^2$ is a member selected from the group consisting of hydrogen and alkyl having no more than 5 carbon atoms, and wherein A is a alkylene group substituted by at least one hydroxyl group, said alkylene group containing 3–30 carbon atoms and said polymer being built up of alternating 2,4,6-triiodobenzoic acid derivative groups of the formula indicated above and the groups A and said polymer containing at least three such 2,4,6-triiodobenzoic acid derivative groups and having an average molecular weight of at least 1900, and physiologically acceptable salts thereof.

3. A polymer as claimed in claim 1, wherein X is

4. A polymer as claimed in claim 2, wherein X is

5. A polymer as claimed in claim 1, wherein X is

6. A polymer as claimed in claim 2, wherein X is

7. A polymer as claimed in claim 3, wherein A is a member selected from the group consisting of
—$CH_2.CH(OH).CH_2.O.CH_2.CH(OH).CH_2$—;
—$CH_2.CH(OH).CH_2.O.CH_2.CH_2.O.CH_2.CH(OH).CH_2$—;
—$CH_2.CH(OH).CH_2.O.(CH_2)_4.O.CH_2.CH(OH).CH_2$—;
$CH_2.CH(OH).CH_2.O.CH_2.CH(OH).CH_2.O.CH_2.CH(OH).CH_2$—;
—$CH_2.CH(OH).CH_2.O.CH_2.CH(OH).CH_2.O.(CH_2)_2.O.CH_2.CH(OH).CH_2.O.CH_2.CH(OH).CH_2$—; and
—$CH_2.CH(OH).CH_2.O.CH_2.CH(OH).CH_2.O.(CH_2)_4.O.CH_2CH(OH).CH_2.O.CH_2.CH(OH).CH_2$—.

8. A polymer as claimed in claim 4, wherein A is a member selected from the group consisting of
CH$_2$.CH(OH).CH$_2$—
—CH$_2$.CH(OH).CH(OH).CH$_2$—.

9. A polymer as claimed in claim 6, wherein A is a member selected from the group consisting of
—CH$_2$.CH(OH).CH$_2$—
—CH$_2$.CH(OH).CH(OH).CH$_2$—.

10. A polymer as claimed in claim 5, wherein A is a member selected from the group consisting of
—CH$_2$.CH(OH).CH$_2$.O.CH$_2$.CH(OH).CH$_2$—;
CH$_2$.CH(OH).CH$_2$.O.CH$_2$.CH$_2$.O.CH$_2$.CH(OH).CH$_2$—;
—CH$_2$.CH(OH).CH$_2$.O.(CH$_2$)$_4$.O.CH$_2$.CH(OH).CH$_2$—;
—CH$_2$.CH(OH).CH$_2$.O.CH$_2$.CH(OH).CH$_2$.O.CH$_2$.CH(OH).CH$_2$—;
—CH$_2$.CH(OH).CH$_2$.O.CH$_2$.CH(OH).CH$_2$.O.(CH$_2$)$_2$.O.CH$_2$.CH(OH).CH$_2$.O.CH$_2$.CH(OH).CH$_2$—;
and
—CH$_2$.CH(OH).CH$_2$.O.CH$_2$.CH(OH).CH$_2$.O.(CH$_2$)$_4$.O.CH$_2$.CH(OH).CH$_2$.O.CH$_2$.CH(OH).CH$_2$—.

* * * * *